(12) United States Patent
Chang et al.

(10) Patent No.: US 9,095,132 B2
(45) Date of Patent: Aug. 4, 2015

(54) ANIMAL TRAP DEVICE

(71) Applicant: NING BO HONGSHUO ELECTRONICS & APPLIANCE CO., LTD., Cixi, Zhejiang (CN)

(72) Inventors: Shih-Ming Chang, Zhejiang (CN); Li Fang, Zhejiang (CN)

(73) Assignee: Ning Bo Hongshuo Electronics & Appliance Co., Ltd., Cixi, Zhejiang (CN)

( * ) Notice: Subject to any disclaimer, the term of this patent is extended or adjusted under 35 U.S.C. 154(b) by 84 days.

(21) Appl. No.: 14/093,535

(22) Filed: Dec. 2, 2013

(65) Prior Publication Data

US 2015/0150235 A1      Jun. 4, 2015

(51) Int. Cl.
*A01M 23/34* (2006.01)

(52) U.S. Cl.
CPC .................................... *A01M 23/34* (2013.01)

(58) Field of Classification Search
CPC ..... A01M 23/24; A01M 23/28; A01M 23/34; A01M 23/245; A01M 23/265
USPC ........................................................ 43/85–88
See application file for complete search history.

(56) References Cited

U.S. PATENT DOCUMENTS

|  |  |  |  |
|---|---|---|---|
| 83,220 A * | 10/1868 | Stone et al. | |
| 817,601 A * | 4/1906 | Werd | 43/87 |
| 1,310,340 A * | 7/1919 | Howe | 43/96 |
| 1,907,360 A * | 5/1933 | Morrill | 43/87 |
| 4,439,947 A * | 4/1984 | Smagner | 43/96 |
| 4,505,064 A * | 3/1985 | Smagner | 43/96 |
| 4,581,844 A * | 4/1986 | Torkko | 43/87 |
| 4,660,319 A * | 4/1987 | Ellwood | 43/96 |
| 5,157,863 A * | 10/1992 | Godwin | 43/87 |
| 6,016,624 A * | 1/2000 | Rose | 43/92 |
| 8,079,174 B1 * | 12/2011 | Turman et al. | 43/87 |
| 2003/0126786 A1 * | 7/2003 | Emond | 43/87 |
| 2014/0215896 A1 * | 8/2014 | Stinnett | 43/87 |

* cited by examiner

*Primary Examiner* — Christopher P Ellis
*Assistant Examiner* — Jessica Wong
(74) *Attorney, Agent, or Firm* — Leong C. Lei

(57) ABSTRACT

An animal trap device includes a base, circular cover plate, elastic element and elastic lasso; at least two posts are configured on one face of the base, and each post includes a stop; a circular cover plate includes a top portion, a surrounding portion and a flange, where the surrounding portion surrounds the circumference of the top portion, and the flange is projected outward from the surrounding portion and positioned below the stops; the elastic element is configured between the base and the circular cover plate, and adapted to provide the circular cover plate with a upward elastic force; the elastic lasso is wound around the surrounding portion, and positioned above the stops. Whereby, the elastic lasso will be blocked by the stops, not moved downward, and not reduce until leaving the surrounding portion when the circular cover plate is exerted with a force to move downward.

9 Claims, 10 Drawing Sheets

ANIMAL TRAP DEVICE

TECHNICAL FIELD OF THE INVENTION

The present invention relates to an animal trap device, and more particularly to a trap capturing an animal with a rope snare.

DESCRIPTION OF THE PRIOR ART

Currently common animal traps mostly are clamp-type and cage-type traps. The above traps spread with bait are placed on animal's haunts, and preys will be attracted by the bait and come close to them while passing by. When the traps are touched, the clamps or fence gates are used to clamp or close preys in the trap, thereby capturing preys. Among these, the clamp-type traps are carried and hit most easily such that they are used most broadly.

However, the clamp-type trap always cause damage to a prey's limbs or even death of the trapped prey due to excessive bleeding; it is a very fierce and cruel trap. In addition, the clamp-type trap uses a strong spring as a power source; a user is always clamped and therefore hurt on the contrary upon assembly thereof because of improper use. Furthermore, the clamp-type traps can be highly disguised, causing an innocent passenger to be clamped or even hurt due to inadvertence.

In addition, the cage-type trap has a pass-through passage; it can be dodged easily by clever preys and immature preys might be captured easily by it such that hunting efficiency thereof is limited. Furthermore, not only the actuation of a gate of the cage-type trap is restricted with a practical environment, but the tray itself is rusty easily. Therefore, the both types of traps mentioned above have no good structure and efficiency.

SUMMARY OF THE INVENTION

To improve the defects mentioned above, the present invention is proposed. The present invention uses a rope snare to capture a prey; it can avoid deep injury to the prey that is always caused in clamp-type trap. Furthermore, if a person is trapped inadvertently by a trap of the present invention, the simple structure of the present invention allows the trapped to release themselves easily; this overcome the deficiencies of conventional traps.

To achieve the objects mentioned above, an animal trap device of the present invention includes a base, circular cover plate, elastic element and elastic lasso; at least two posts are configured on one face of the base, and each post includes a stop; a circular cover plate includes a top portion, a surrounding portion and a flange, where the surrounding portion surrounds the circumference of the top portion, and the flange is projected outward from the surrounding portion and positioned below the stops; the elastic element is configured between the base and the circular cover plate, and adapted to provide the circular cover plate with a upward elastic force; the elastic lasso is wound around the surrounding portion, and positioned above the stops. Whereby, the elastic lasso will be blocked by the stops, not moved downward, and not reduce until leaving the surrounding portion when the circular cover plate is exerted with a force to move downward.

The trap device constituted by the elements mentioned above is not adopted with a sharp clamp such that the captured prey's invasive wound is not caused, thereby preventing the death of the captured prey due to wound infection or excessive bleeding.

Preferably, the flange further includes at least two gaps, each of which is larger than the stop, thereby assembling the circular cover plate conveniently.

Preferably, each post further includes an engagement groove, at least two tenons corresponding to these engagement grooves are configured on the flange, thereby positioning the circular cover plate so as to facilitate the configuration of the elastic lasso.

Preferably, a plurality of blocking sheets are coupled pivotally to the top portion. The blocking sheets can be rotated out to expose partly above the elastic lasso, thereby facilitating a user to assemble the elastic lasso or move the entire trap, and preventing the sliding-out of the elastic lasso due to inadvertence.

Preferably, the blocking sheet and the top portion are configured with corresponding positioning structures, adapted to position the blocking sheets.

Preferably, the positioning structures includes a convex point configured on the blocking sheet and at least one through hole configured on the top portion, or the positioning structures includes a through hole configured on the blocking sheet and at least one convex point configured on the top portion.

Furthermore, the elastic lasso includes a rope and a spring, where the rope includes a main body, a fixed end and a movable end. The movable end is configured on the main body after the rope is wound around one circle, and the spring adapted to provide the movable end with a push force is configured on the body and positioned between the fixed end and the movable end.

Preferably, the fixed end further includes a retainer ring, adapted to couple to other rope or fixed object.

DETAILED DESCRIPTION OF THE PREFERRED EMBODIMENTS

Figure 1:
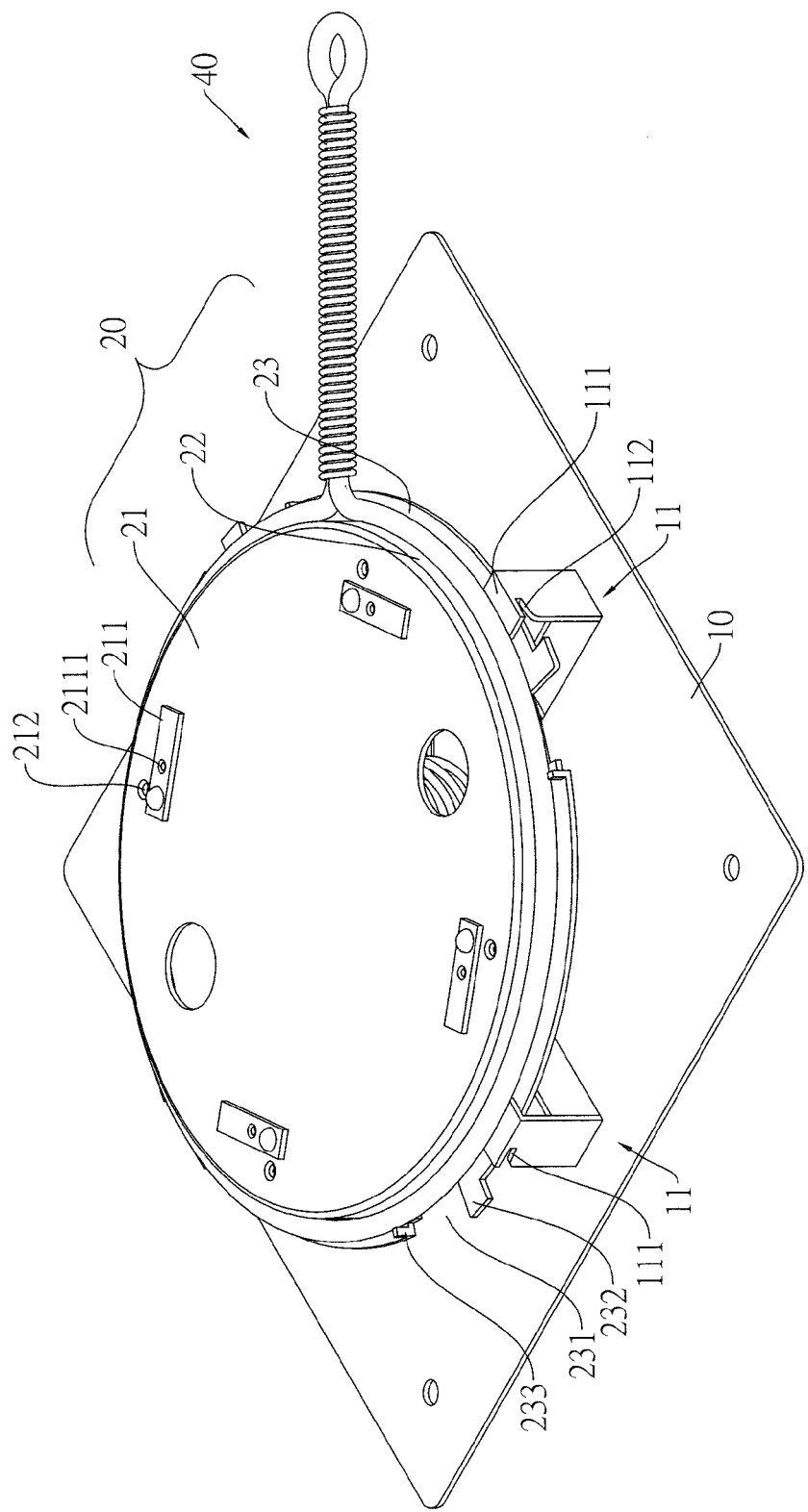
FIG. 1 is a perspective view of a preferred embodiment according to the present invention.
Figure 2:
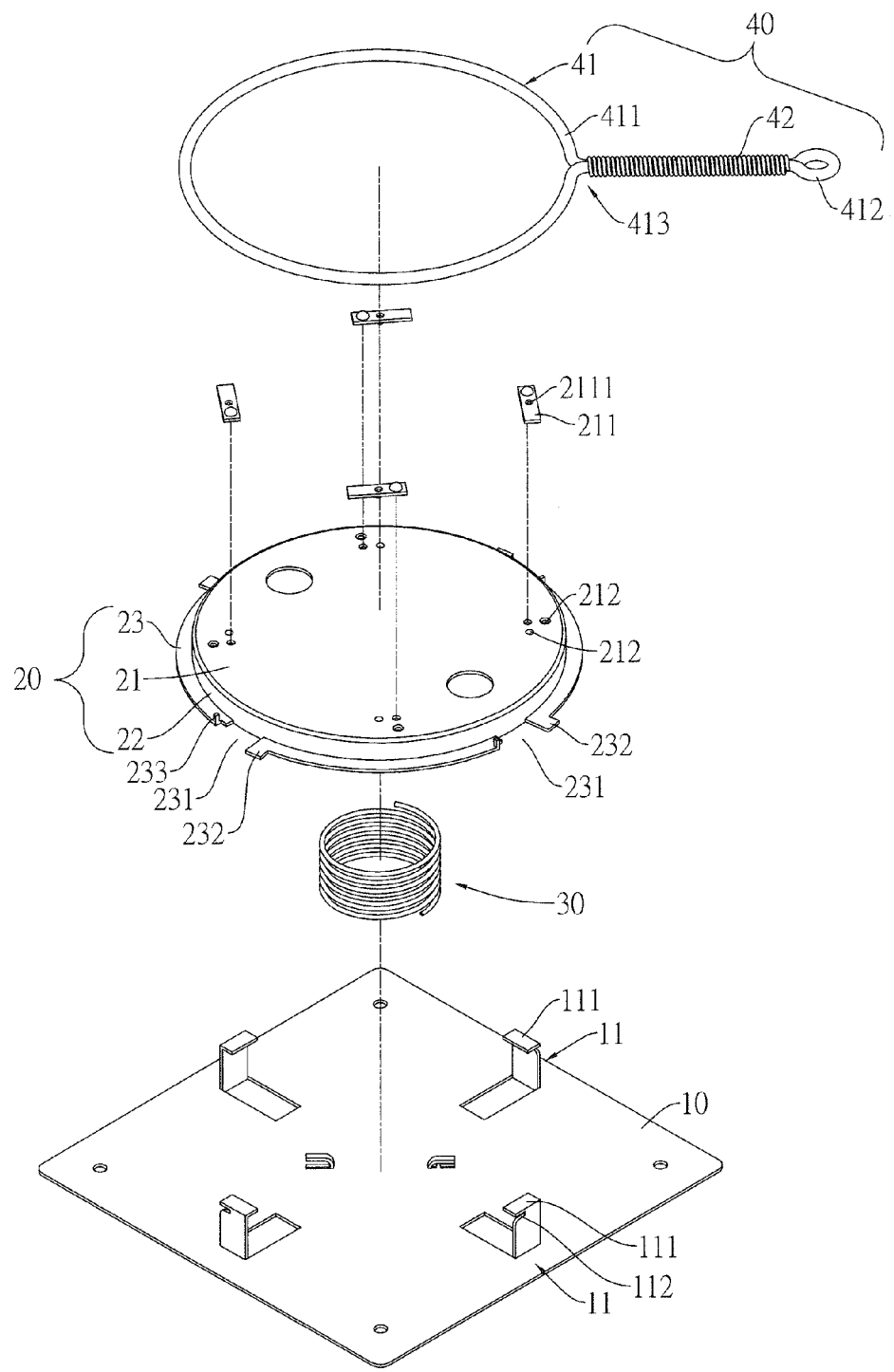
FIG. 2 is an exploded view of the embodiment according to the present invention.
Figure 3:
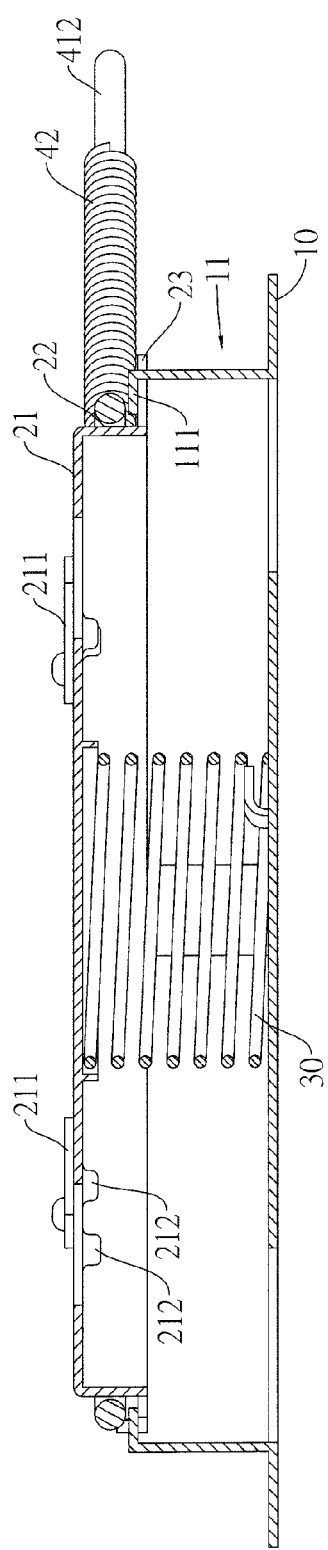
FIG. 3 is a cross-sectional view of the embodiment according to the present invention.

Referring to FIGS. 1 to 3, an animal trap device includes a base 10, a circular cover plate 20, an elastic element 30 and an elastic lasso 40.

Furthermore, a face of the base 10 is disposed with at least two posts 11 (in the present embodiment, for example, four posts 11 are adopted, as the figures show), each of which includes a stop 111. In addition, the circular cover plate 20 includes a top portion 21. a surrounding portion 21 and a flange 23, the surrounding portion 21 surrounding the circumference of the top portion 21, and the flange 23 being projected outward from the surrounding portion 22 and positioned below the stops 111.

Furthermore, the elastic element 30, adapted to provide the circular cover plate 20 with a upward elastic force so as to allow the flange 23 of the circular cover plate 20 to be pressed against the stops 111 as FIG. 3 shows, is configured between the base 10 and circular cover plate 20.

Furthermore, the elastic lasso 40 is wound around the surrounding portion 22 and positioned above the stops 111; the elastic lasso 40 will be tightened rapidly when it leaves the surrounding portion 22, where the implementation structures of the elastic lasso 40 may include a rope 41 and a spring 42. The rope 41 includes a main body 411, a fixed end 412 and a movable end 413, where the movable end 413 is coupled to the main body 411 after the rope 41 is wound around one circle, and the spring 42 is configured on the main body 411 and positioned between the fixed end 411 and the movable end 413 so as to provide the movable end 413 with a push force. Therefore, the movable end 411 is allowed to move in an opposite direction to the fixed end 412 to cause the wound circle to reduce rapidly after the rope 41 is released from the surrounding portion 22, and the movable end 413 will not stop moving until the rope is wound around an object tightly. It must be noted that the elastic lasso 40 is only explanatory and exemplary, the present invention is not so limited, and all elastic lassos with a knot or other structure, which can achieve the same object, may be used as an equivalent device of the present invention.

The fixed end 412 may further include a retainer ring 4121, which may be coupled to other fixed object or extension wire.

Figure 4:
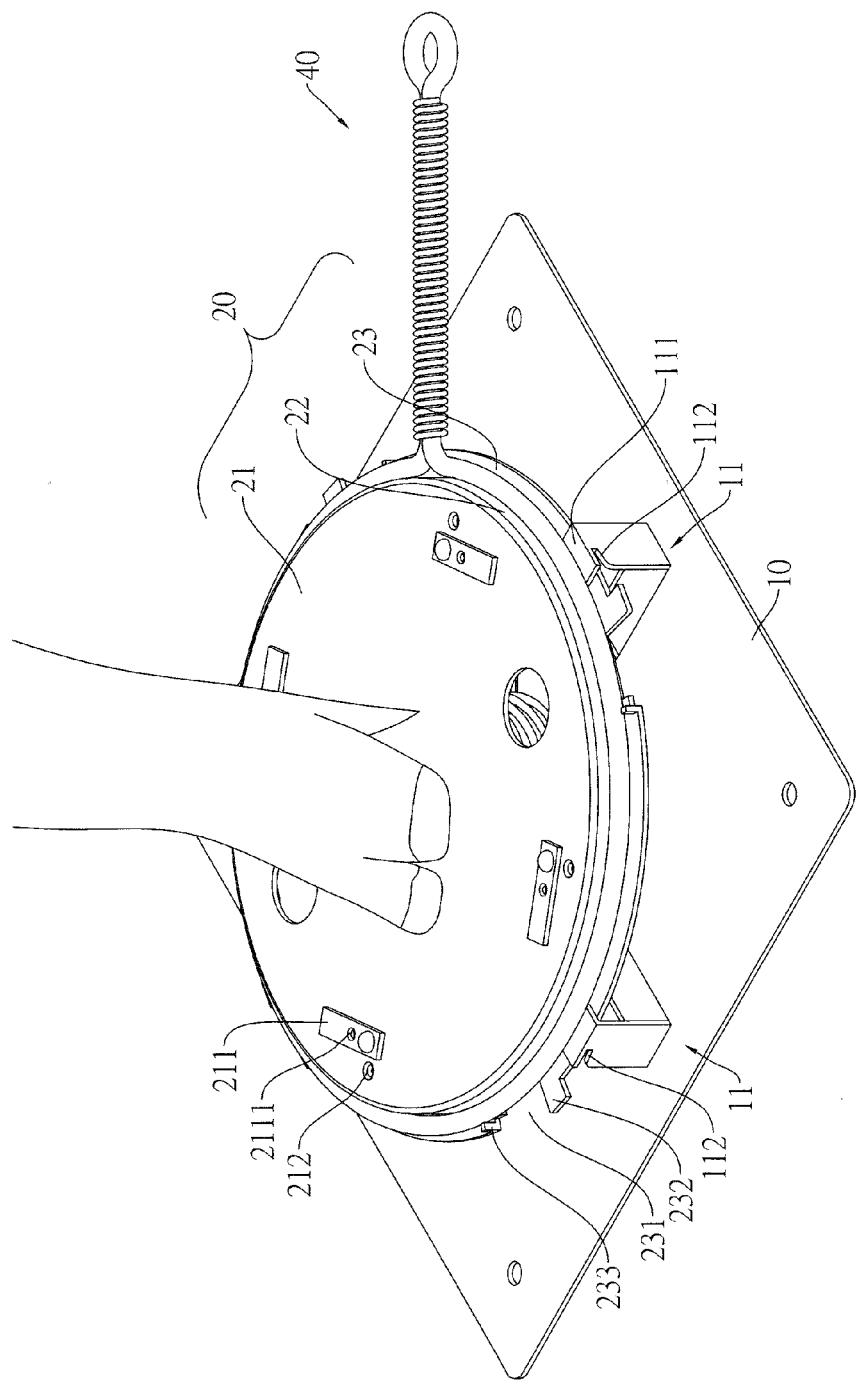
FIGS. 4 to 6 are schematic views of actuation of the embodiment according to the present invention' and FIGS. 7 to 10 are schematic views of assembly steps of the present invention according to the present invention.
Figure 5:
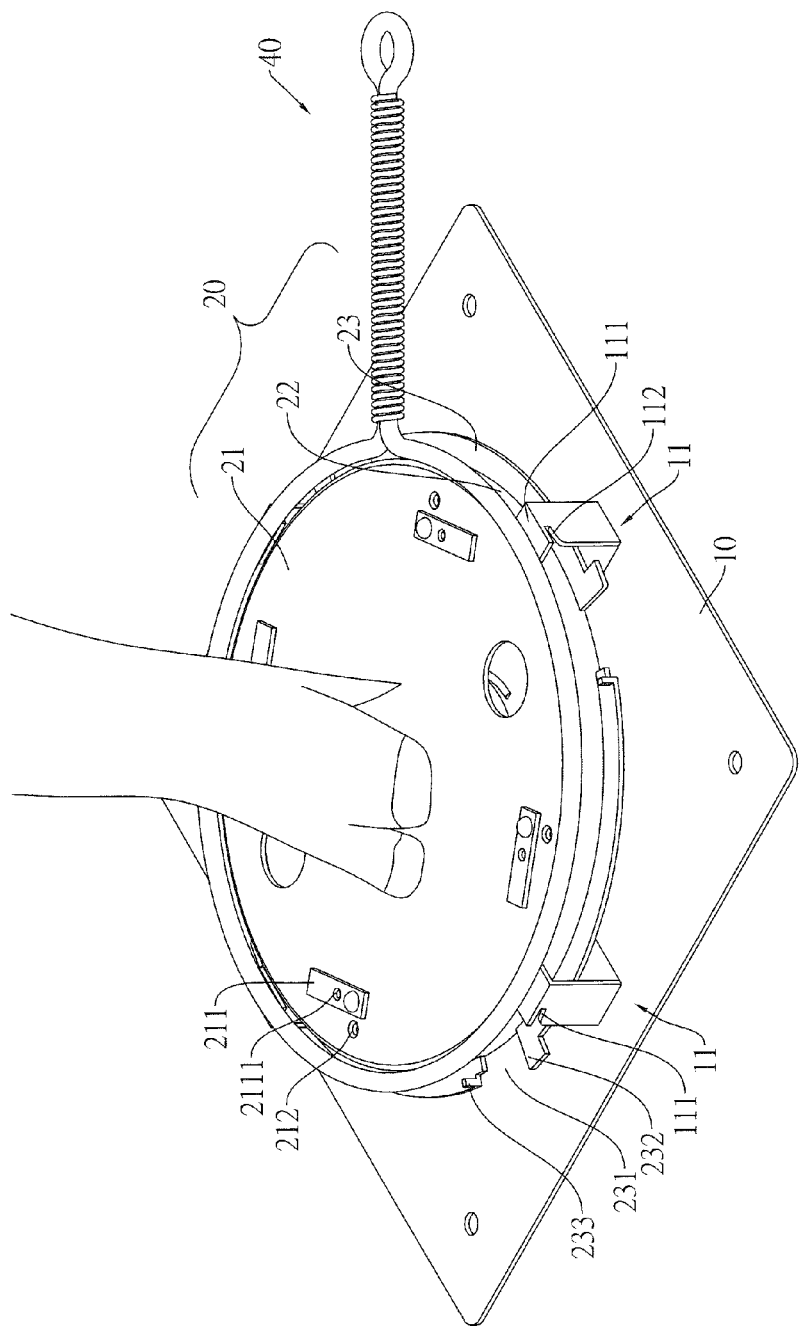
Figure 6:
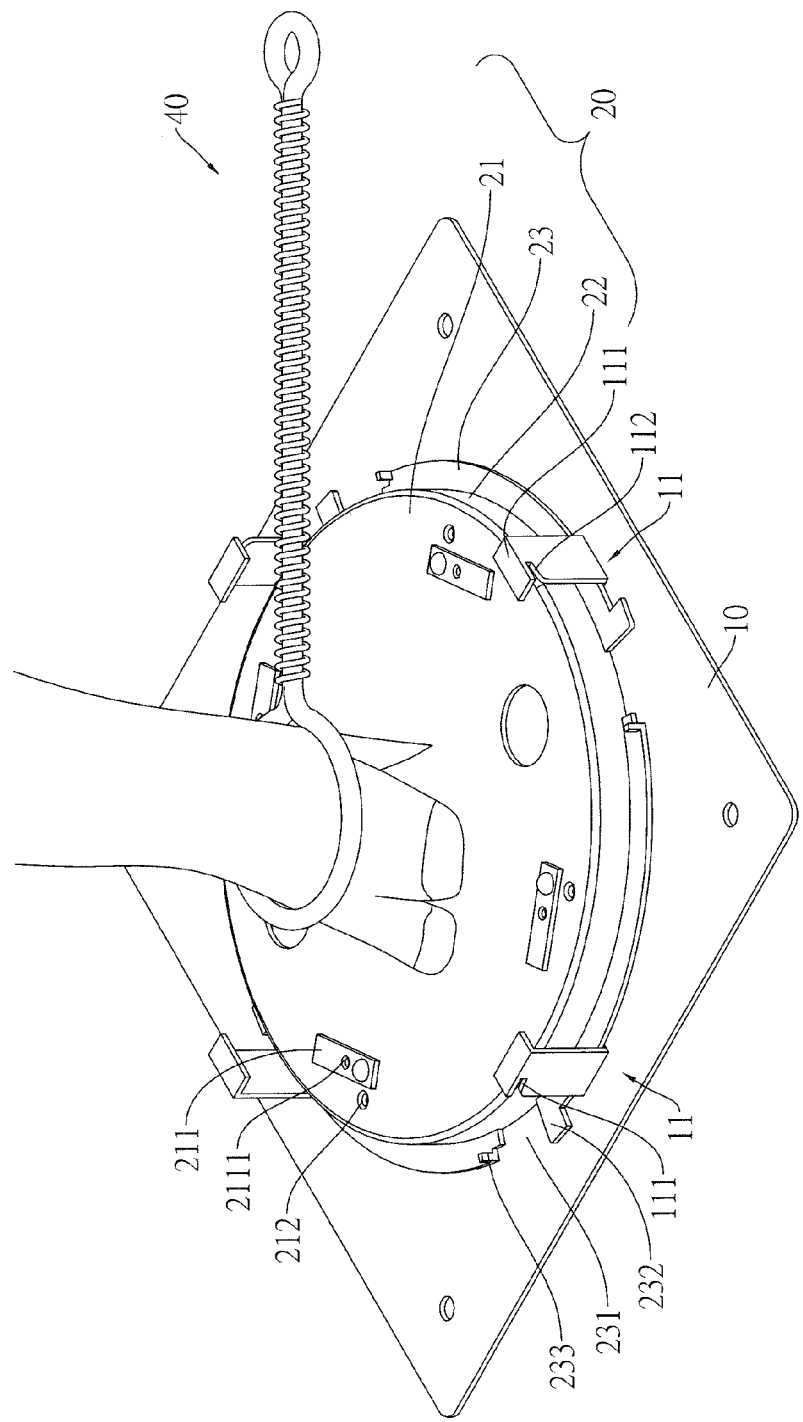

Referring to FIGS. 4 to 6, the elastic lasso 40 is not moved downward due to the blocking of the stops 111(see FIG. 5) when he circular cover plate 20 is exerted with a force to overcome the strength of the elastic element 30 to move downward, and the elastic lasso 40 will be released from the surrounding 22 and thereafter tightened after the top portion 21 is close to the stops 111 (see FIG. 6), thereby achieving the capture of an animal.

It is noted from the elements mentioned above that the embodiment does not use any sharp pointed object such that it does not cause a wound on the captured animal deep into its body, thereby preventing its death caused from excessive bleeding due to the wound on it. Furthermore, a person may hold the tightened rope open by themselves to release them from it because it is nothing but a rope snare even if they are trapped inadvertently.

Furthermore, referring to FIG. 2 again, the flange 23 further includes at least two gaps 231, each of which is larger than the stop 111. In addition, each post 11 further includes an engagement groove 112, and at least two tenons 232 respectively corresponding to the engagement grooves 112 are configured on the flange 23. A plurality of blocking sheets 211 are coupled pivotally to the top portion 21, and can be rotated out thereof and exposed above the elastic lasso 40. Corresponding positioning structures are respectively configured on blocking sheets 211 and the top portion 21 so as to allow the blocking sheets 21 to be positioned on the top portion 21 by the positioning structures; for example, positioning structures include a convex point 2111 disposed on the blocking sheet 211 and at least one through hole 212 disposed on the top portion 21 so that the blocking sheet 211 is allowed to be buckled and positioned on the top portion 21 after the convex point 211 is engaged with the through hole 212. In the embodiment, two through holes 212, which are respectively adapted to allow the blocking sheet 211 to project out the top portion 21 and not to project out of the top portion 21, may disposed around the each blocking sheet 211 as the figures show. It is naturally that these positioning structures may be interchanged, i.e. the through hole is disposed on the blocking sheet 211 and the convex point on the top portion 21, which still can have the same effect. In addition, there are many other positioning structures that can be used as the positioning structures of the present invention if they are equivalent structures capable of positioning the blocking sheet 211.

Figure 7:
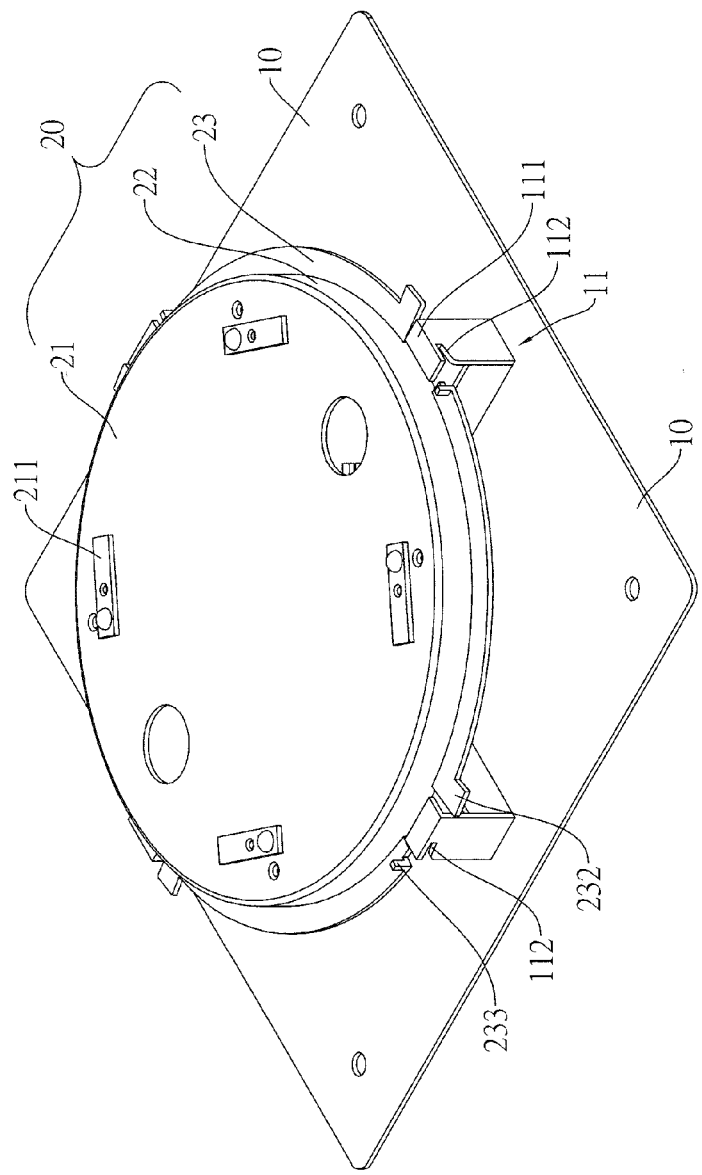
Figure 8:
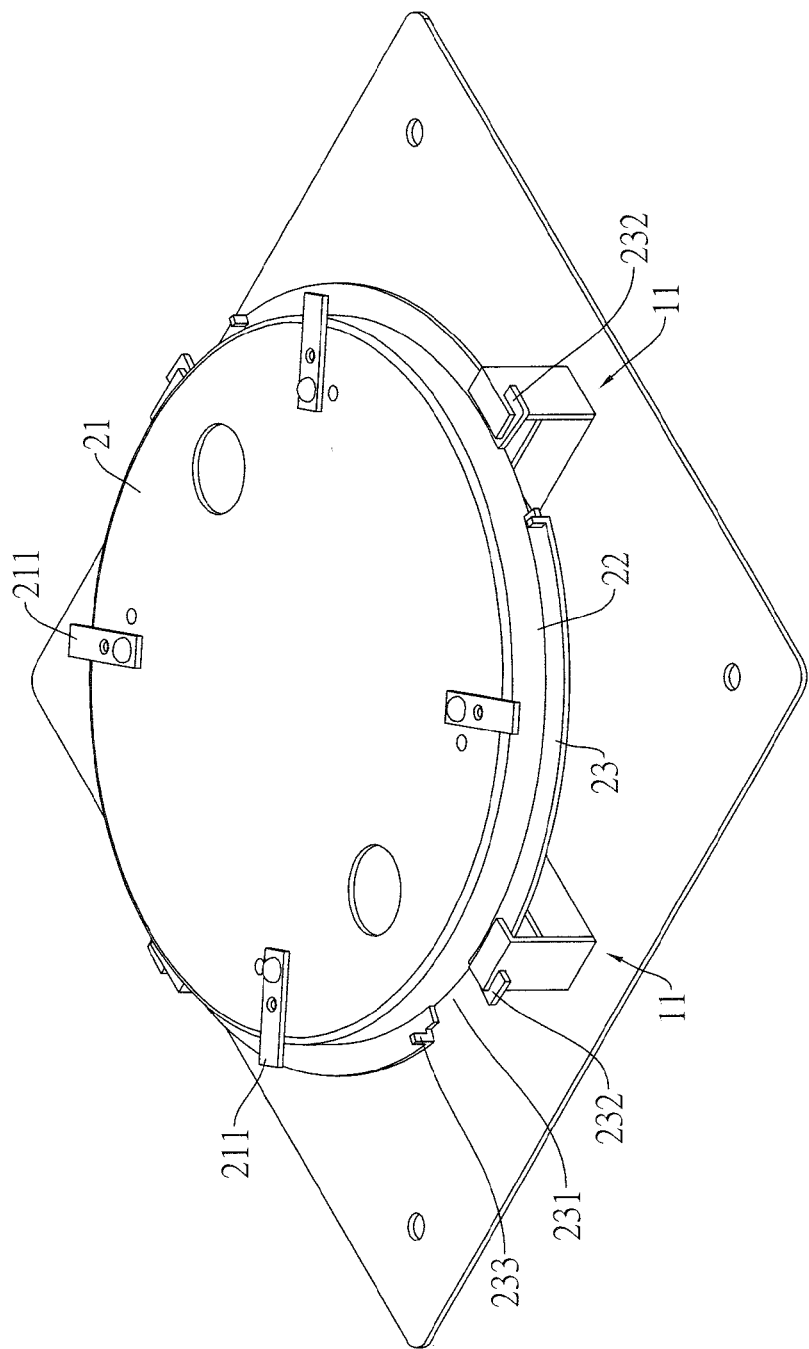
Figure 9:
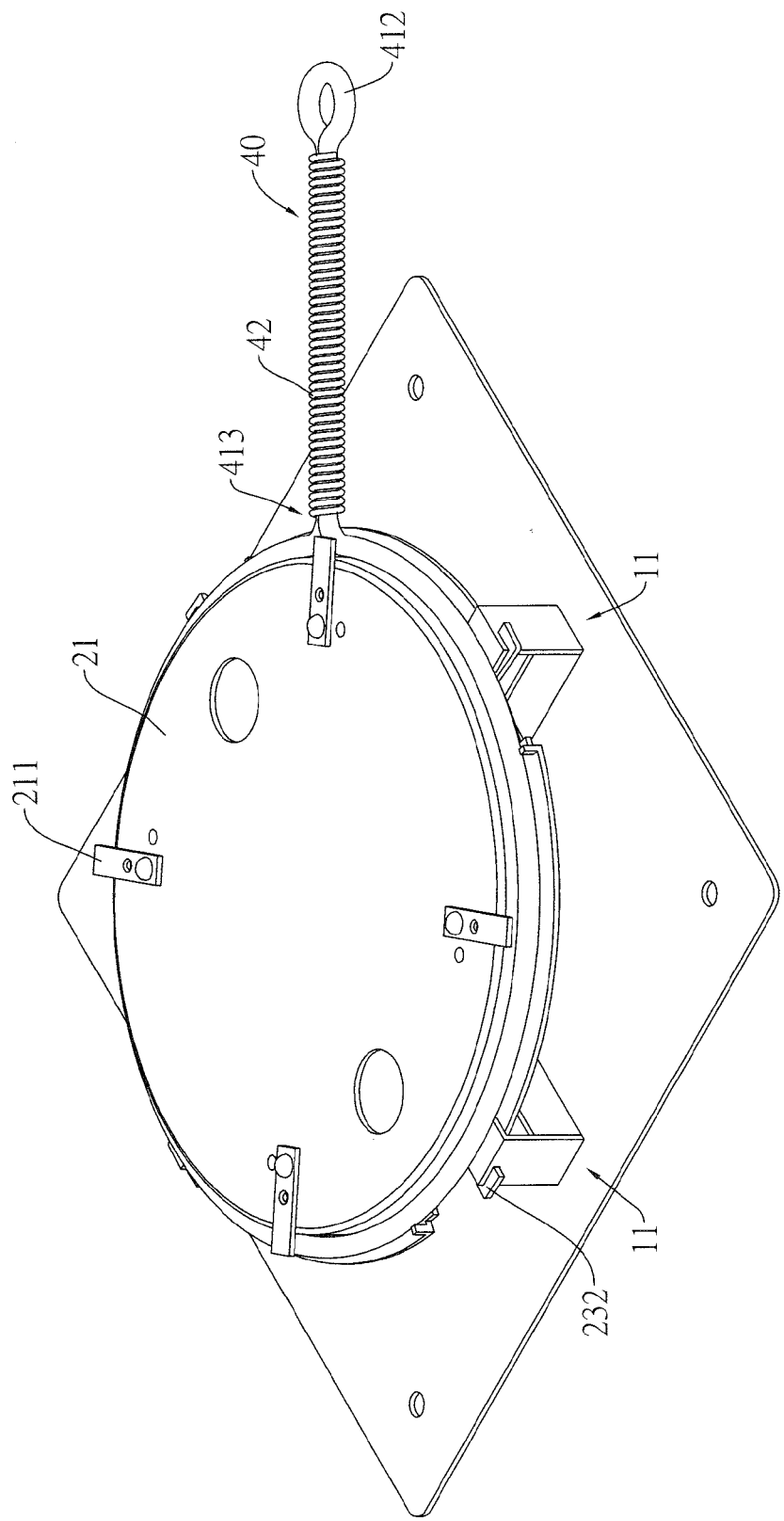
Figure 10:
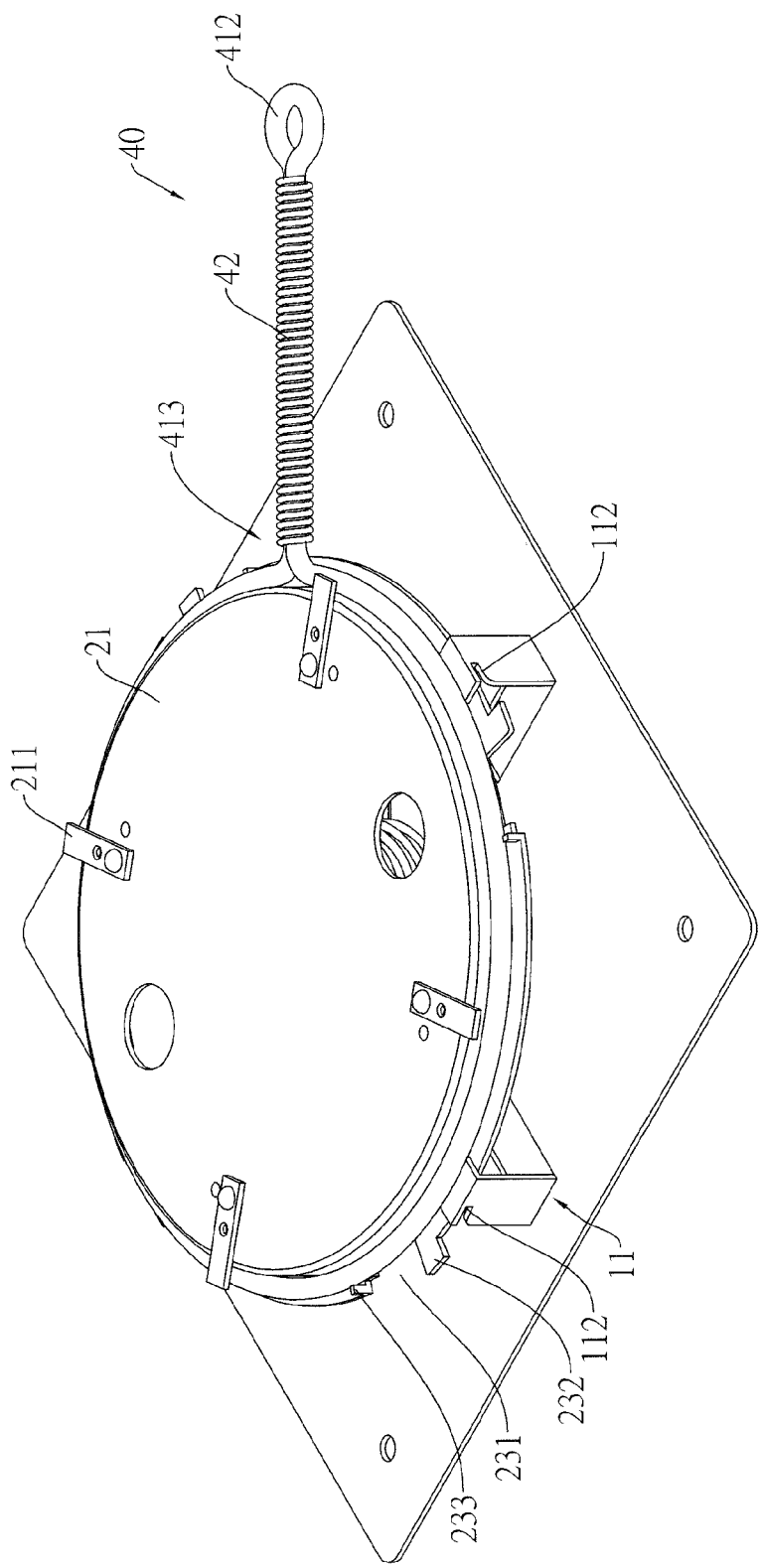

Taking the structures mentioned above, referring to FIGS. 7 to 10, the combination manner of the present embodiment is that each gap 231 on the circular cover plate 20 is first aligned with the corresponding post 11 as FIG. 7 shows, and the circular cover plate 20 is then rotated to allow the tenon 232 to be engaged with the engagement groove 112 to retain the circular cover plate 20 in position after the stop 111 on the post 11 is passed through the gap 231. Thereafter, the movable end 413 of the elastic lasso 40 is moved toward the fixed end 412 to form a snare wound around the surrounding portion 22. and the blocking sheets 211 is fixed projecting out of the top portion 21, causing the snare formed by the elastic lasso 40 is limited between the blocking sheets 211 and the flange 23. Next, the circular cover plate 20 is rotated to release the tenons 232 from the engagement grooves 112 after the rope is wound around the surrounding portion 22 as FIG. 10 shows. At this point, the elastic lasso 40 will maintain the present situation without leaving the position between the blocking sheets 211 and the flange 23 due to the blocking of the blocking sheets 211 even if an operator presses the circular cover plate 20 down inadvertently because the snare formed by the elastic lasso 40 is limited between the blocking sheets 211 and the flange 23. Finally, the blocking sheets are turned inside the circumference of the top portion 21 and positioned there to form a pattern as shown in FIG. 1 shows.

In addition, a stopping block 233, which is projected upward from the flange 23, is configured at one side of each gap 231. The circular cover plate 20 is prevented from being rotated too far to move the gap 231 to the stop 111 to cause the circular cover plate 20 to be sprung out due to the pressing of the elastic element 30 when an operator rotates the circular cover plate 20 to release the tenon 232 from the engagement groove 112.

We claim:

1. An animal trap device, comprising:
    a base, at least two posts being configured on one face thereof, each post comprising a stop;
    a circular cover plate, comprising:
        a top portion;
        a surrounding portion, surrounding a circumference of said top portion; and
        a flange, projected outward from said surrounding portion, and positioned below said stops;
    an elastic element, configured between said base and said circular cover plate, and adapted to provide said circular cover plate with a upward elastic force; and
    an elastic lasso, wound around said surrounding portion, and positioned above said stops;
    wherein said elastic lasso will be blocked by said stops and not moved downward, and not reduce until leaving said surrounding portion when said circular cover plate is exerted with a force to move downward.

2. The device according to claim 1, wherein said flange further comprises at least two gaps, and each said gap is larger than said corresponding stop.

3. The device according to claim 2, wherein each said post further comprises an engagement groove, and at least two tennons corresponding to said engagement grooves are respectively configured on said flange.

4. The device according to claim 3, wherein a plurality of blocking sheets are coupled pivotally to said top portion, said blocking sheets is partly rotatable out of said top portion to expose above said elastic lasso.

5. The device according to claim 4, wherein said blocking sheets and said top portion are configured with a plurality of corresponding positioning structures.

6. The device according to claim 5, wherein said plurality of positioning structures comprise a convex point disposed on said blocking sheet, and at least one through hole disposed on said top portion, or said plurality of positioning structures comprise a through hole disposed on said blocking sheet, and at least one convex point disposed on said top portion.

7. The device according to claim 6, wherein said elastic lasso comprises:
   a rope, comprising a main body, a fixed end and a movable end, said movable end being coupled to said main body after said rope is wound around said surrounding portion; and
   a spring, configured on said main body and positioned between said fixed end and said movable end, and adapted to provide said movable end with a push force.

8. The device according to claim 7, wherein said fixed end further comprises a retainer ring.

9. The device according to claim 8, wherein a stopping block is configured at one side of said gap, and said stopping block is projected upward from said flange.

* * * * *